US012155691B2

(12) United States Patent
Koral et al.

(10) Patent No.: US 12,155,691 B2
(45) Date of Patent: Nov. 26, 2024

(54) DETECTING AND MITIGATING DENIAL OF SERVICE ATTACKS OVER HOME GATEWAY NETWORK ADDRESS TRANSLATION

(71) Applicant: AT&T Intellectual Property I, L.P., Atlanta, GA (US)

(72) Inventors: Yaron Koral, Cherry Hill, NJ (US); Shraboni Jana, Danville, CA (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 202 days.

(21) Appl. No.: 17/728,348

(22) Filed: Apr. 25, 2022

(65) Prior Publication Data

US 2023/0344862 A1 Oct. 26, 2023

(51) Int. Cl.
*H04L 9/40* (2022.01)

(52) U.S. Cl.
CPC .... *H04L 63/1458* (2013.01); *H04L 2463/142* (2013.01)

(58) Field of Classification Search
CPC ............ H04L 63/1458; H04L 2463/142
See application file for complete search history.

(56) References Cited

U.S. PATENT DOCUMENTS

| 11,563,772 | B2 * | 1/2023 | Doron | H04L 43/0876 |
| 11,838,197 | B2 * | 12/2023 | Thorat | H04L 47/2483 |
| 2019/0208551 | A1 * | 7/2019 | Mou | H04L 61/4552 |
| 2022/0303208 | A1 * | 9/2022 | Rahman | H04L 43/0876 |

FOREIGN PATENT DOCUMENTS

| CN | 101572930 B | * | 8/2012 | ....... H04L 29/12028 |
| CN | 108289104 A | * | 7/2018 | ............ H04L 45/02 |
| CN | 116132081 A | * | 5/2023 | |

OTHER PUBLICATIONS

Conti et al, "Lightweight solutions to counter DDOS attacks in software defined networking", Apr. 25, 2019, Wireless Networks, p. 1-18.*

* cited by examiner

*Primary Examiner* — Christopher A Revak
(74) *Attorney, Agent, or Firm* — Hartman & Citrin LLC

(57) ABSTRACT

Aspects of detecting and mitigating denial of service ("DoS") attacks over home gateway network address translation ("NAT") are disclosed herein. According to one aspect disclosed herein, a home gateway system can detect that a NAT table is overpopulated. In response to detecting that the NAT table is overpopulated, the home gateway system can determine a mitigation action to be performed. The home gateway system can then perform the mitigation action in an attempt to mitigate an effect of the NAT table overpopulation.

16 Claims, 13 Drawing Sheets

NETWORK ADDRESS TRANSLATION TABLE 114

| | INTERNAL SOURCE IP ADDRESS 200 | INTERNAL SOURCE PORT 202 | EXTERNAL SOURCE IP ADDRESS 204 | EXTERNAL SOURCE PORT 206 | PROTOCOL 208 | DESTINATION IP ADDRESS 210 | DESTINATION PORT 212 |
|---|---|---|---|---|---|---|---|
| 116A | 10.0.0.23 | 20910 | 161.1.2.3 | 30001 | TCP | 202.1.3.4 | 443 |
| 116B | 10.0.0.23 | 3722 | 161.1.2.3 | 30022 | UDP | 140.3.44.2 | 53 |
| 116C | 10.0.0.12 | 33200 | 161.1.2.3 | 20011 | TCP | 202.1.3.4 | 443 |
| 116D | 10.0.0.12 | 82736 | 161.1.2.5 | 10202 | TCP | 160.5.3.33 | 22 |

*FIG. 2*

DEVICE TABLE 128

| DEVICE TYPE 302 | MAC 304 | HOURS/DAY 306 | AVG. ENTRIES/DAY 308 | PEAK HOUR(S) OF DAY 310 | AVG. ENTRIES/PEAK HOUR 312 | MAX ENTRIES 314 |
|---|---|---|---|---|---|---|
| COMPUTER | XXXXXXXX | 6 | 10 | 8 PM | 12 | 20 |
| IOT | YYYYYYYY | 5 | 1 | 8 PM, 9 PM, 10 PM | 1 | 2 |
| SMARTPHONE | ZZZZZZZZ | 17 | 36 | 3 PM – 6 PM | 25 | 62 |

*FIG. 3*

DETECTING AND MITIGATING DENIAL OF SERVICE ATTACKS OVER HOME GATEWAY NETWORK ADDRESS TRANSLATION

BACKGROUND

The video game industry had a total revenue of approximately $77 billion in 2020 and this trend likely will continue. Internet access using broadband connectivity via fiber or cable is the preferred choice of gamers. With the extensive deployment of fiber-to-the-home and with WI-FI speeds tripling in recent years, WI-FI and ethernet-enabled home gateways have become the most popular access network used by gamers. Gamers are at high risk of distributed denial of service ("DDoS") attacks and a projection by industry researchers indicates DDoS attacks will reach 15.4 million by 2023, almost double from 2019. The popularity of gaming applications in a home network makes home gateways an attractive target for attackers who want to deny Internet connectivity to their victims/opponents. This is especially relevant to VIP targets such as online gamers who often spend disposable income in their gaming accounts. An easy-to-implement denial of service ("DoS") attack method for home networks is to overpopulate the network address translation ("NAT") of the home gateway and, therefore, deny any new connections to the Internet.

Home networks provide access to a mixed set of devices that typically include computers, smartphones, tablets, video game consoles, internet of things ("IoT") devices, and the like. The average number of devices in a home network is approximately 9 for a random population of 500K in-home broadband customers. These devices are assigned Internet protocol ("IP") addresses by the home gateway using dynamic host configuration protocol ("DHCP"). Therefore, devices can use these addresses only within the home network. In addition, the home gateway maintains one or more public IP addresses that all home network devices must share. When a device initiates an IP connection (e.g., transfer control protocol "TCP" or user datagram protocol "UDP") to the Internet, the home gateway creates a record that translates the internal connection parameters to external (Internet domain) parameters. The home gateway stores the record in a NAT table. This mechanism is vulnerable to a DoS attack. Attackers who have access to a device within the home network can generate many connection requests to the Internet, thereby creating many NAT entries that may eventually overpopulate the NAT table. When the NAT table is full, all the devices in the home network cannot connect to the Internet. Thus, this is a case of DoS of Internet connectivity. An example of such an attack is when an attacker with access to an IoT device, such as a smart light bulb, can launch a simple network scan using a tool, such as Nmap, and can quickly generate millions of NAT entries. Another example is when an attacker with access to the IP address of the home gateway or the media access control ("MAC") address can begin pinging the home gateway indefinitely with the maximum allowable ping size.

Current mechanisms to address the aforementioned attacks are reactive with no mechanisms that proactively detect and/or mitigate NAT overpopulation by IoT devices using a home gateway. For example, some solutions propose using an additional node in the network to counter DDoS attacks whereas other solutions are relevant to wide area network ("WAN") only. The reactive mechanism of automated altering in-home customers does not fit with VIP users (e.g., VIP gamers) who are emotionally, socially, and/or financially invested in having Internet connectivity where latency is key. The conventional solution of requiring the user to reboot their home gateway is also not an option.

SUMMARY

Concepts and technologies disclosed herein are directed to detecting and mitigating DoS attacks over home gateway NAT. According to one aspect of the concepts and technologies disclosed herein, a home gateway system can include a processor and a memory. The memory can include instructions that, when executed by the processor, cause the processor to perform operations. More particularly, the home gateway system can detect that a NAT table is overpopulated. In response to detecting that the NAT table is overpopulated, the home gateway system can determine a mitigation action to be performed. The home gateway system can then perform the mitigation action in an attempt to mitigate an effect of the NAT table overpopulation.

In some embodiments, the home gateway system can identify a plurality of devices operating as part of a home network. The home gateway system can learn an expected behavior regarding a number of NAT table entries that each device of the plurality of devices consumes. The home gateway system can create and maintain a device table. The device table can include a device type (e.g., IoT device, smartphone, or computer), a media access control ("MAC") address, and one or more device statistics for each device of the plurality of devices. The home gateway system can determine a NAT table size statistic that is representative of an overall size of the NAT table. The home gateway system also can identify one or more data trends for each device of the plurality of devices based upon the device statistic(s) and the NAT table size statistic. The device statistics can include a number of hours of activity per day, an average number of NAT table entries per day, an indication of a peak hour of day, an average number of NAT table entries during the peak hour of day, and/or a maximum number of NAT table entries.

In some embodiments, the home gateway system can track the overall size of the NAT table and can determine whether the overall size of the NAT table meets or exceeds an overpopulation threshold. The overpopulation threshold can be derived, at least in part, from the device statistic(s). In response to determining that the overall size of the NAT table meets or exceeds the overpopulation threshold, a status of the home gateway system can be changed to an alert mode. The home gateway system can then identify at least one device of the plurality of devices that is responsible for generating an excessive number of NAT table entries.

In some embodiments, the home gateway system can identify any of the plurality of devices with an absolute high number of NAT table entries. The home gateway system can distinguish between any of the plurality of devices that generate high traffic in general and any of the plurality of devices that primarily generate empty or nearly empty connections. The home gateway system also can identify any of the plurality of devices that have a low volume to number of NAT table entries ratio.

In some embodiments, the home gateway system can identify whether any of the plurality of devices are involved in a network scanning activity. In response to determining that at least one device of the plurality of devices is involved in the network scanning activity, the home gateway system can determine the device type of the at least one device. The home gateway system can flag the at least one device as malicious based upon the device type being a certain device type. For example, an IoT device that is involved in the network scanning activity may be flagged as malicious because the IoT device does not typically engage in such activity, whereas a computer that periodically performs a network scan as part of a routine may not be flagged as malicious.

In some embodiments, the mitigation action includes evacuating, from the NAT table, at least one NAT table entry that is associated with a low volume, tagged as part of the network scanning activity, or associated with the at least one device flagged as malicious. In some embodiments, the mitigation action includes blacklisting a particular device of the plurality of devices. In some embodiments, the mitigation action includes limiting a maximum number of simultaneous NAT table entries that a particular device is allowed to maintain. Multiple mitigation actions can be used.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 2 is a table diagram illustrating an example network address translation table, according to an illustrative embodiment of the concepts and technologies disclosed herein.

FIG. 3 is a table diagram illustrating an example device table, according to an illustrative embodiment of the concepts and technologies disclosed herein.

DETAILED DESCRIPTION

Figure 1:
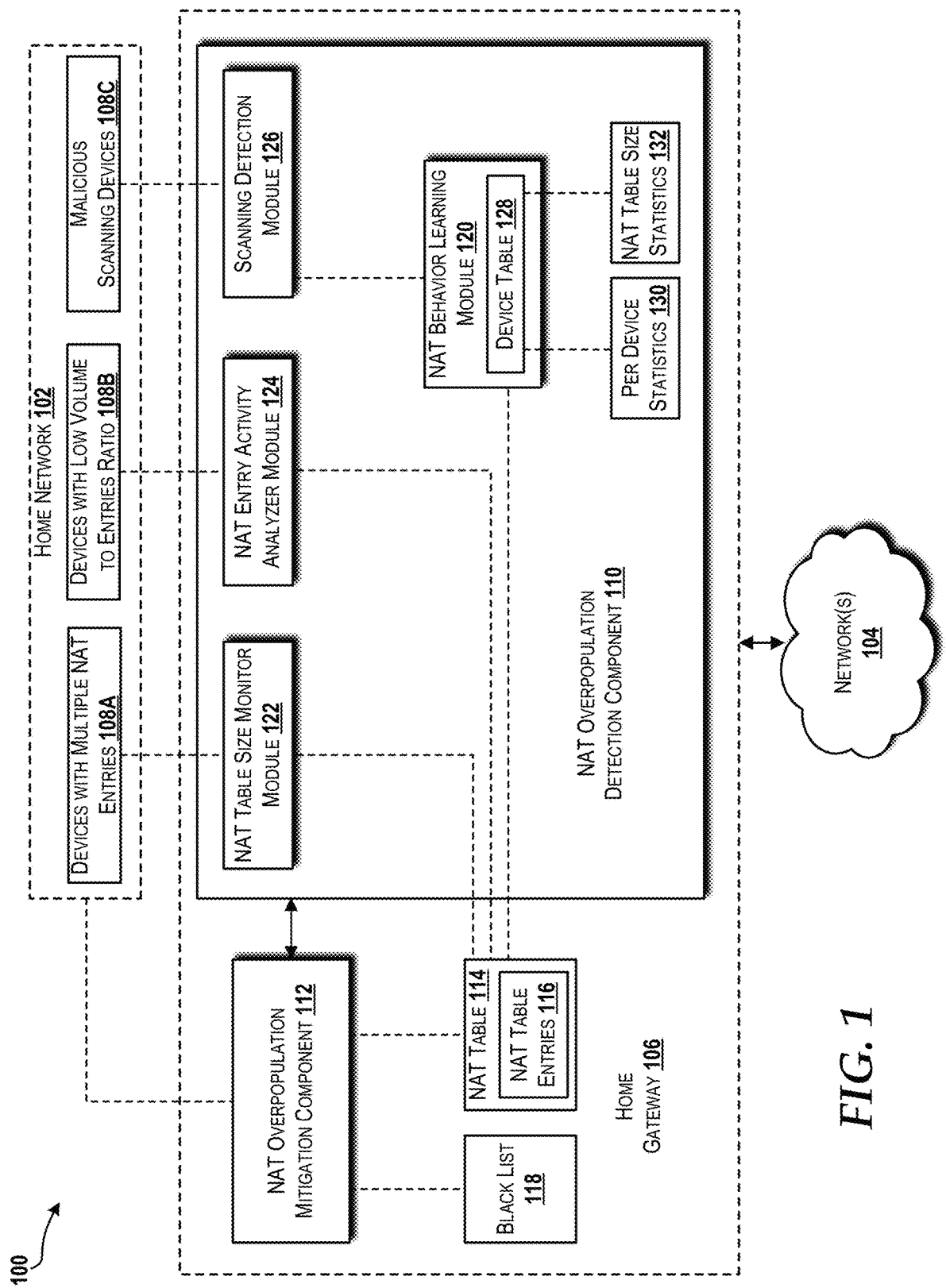
FIG. 1 is a block diagram illustrating aspects of an illustrative operating environment in which aspects of the concepts and technologies disclosed herein can be implemented.

Current residential/home gateway implementations do not handle threats to the NAT that originate from devices in a home (internal) network. Instead, current implementations focus on threats that originate from the Internet. In contrast, concepts and technologies disclosed herein protect against launching DoS attacks, especially when vulnerable IoT devices are so prevalent in home networks. Service providers can use the concepts and technologies disclosed herein to provide security services to home network customers and to provide these functions to residential/home gateway vendors.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for detecting and mitigating DoS attacks over home gateway NAT will be described.

Turning now to FIG. 1, a block diagram illustrating aspects of an operating environment 100 in which aspects of the concepts and technologies disclosed herein can be implemented will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 illustrates a home network 102 that, in turn, can communicate with one or more networks 104, such as one or more Internet service provider ("ISP") network(s) and/or the Internet, via a home gateway system ("home gateway") 106. The home network 102 can be or can include one or more local area networks ("LANs"), including one or more wireless LANs ("WLANs") and/or one or more wired/fixed LANs (e.g., ethernet). In the illustrated example, a plurality of devices 108 are operating within the home network 102. In general, the plurality of devices 108 can include one or more mobile devices (e.g., smartphones), one or more IoT devices (e.g., smart home devices), one or more media devices (e.g., television, streaming device, set-top box, video game system, and/or the like). It should be understood that the plurality of devices 108 can be any device that is capable of communicating with the home network 102 via a wired and/or wireless connection to interact with other devices connected to the home network 102 and/or the network(s) 104. More particularly, the plurality of devices 108 can include one or more devices with multiple NAT table entries (shown generally as 108A), one or more devices with a low data volume to NAT table entries ratio (shown generally as 108B), and one or more malicious scanning devices (shown generally as 108C). A device with a low data volume to NAT table entries ratio can create multiple connections but does not send much data for each connection, for example, a device that created 1000 connections but actively sends only 10 bytes per minute for each connection just to keep the connections active. This behavior is suspicious because it appears that the device has opened too many connections without properly utilizing the connections. Therefore, a device behaving in such a way may be indicative of an attempt to overpopulate a NAT table. Additional details about these devices 108A-108C will be described below.

The home network 102 can communicate with the network(s) 104 via the home gateway 106. The network(s) 104 can be or can include one or more fixed broadband communications networks implemented via fiber optic, coaxial cable, digital subscriber line ("DSL"), broadband over power lines, a combination thereof, and/or the like. The network(s) 104 can be or can include one or more wireless communications networks implemented using one or more wireless technologies disclosed herein. The network(s) 104 also can include the Internet. The home gateway 106 can be or can include a modem that enables connectivity to the network(s) 104. The home gateway 106 additionally can provide other functionality such as routing, switching, and the like for the home network 102. Aspects of the home gateway 106 can be enabled via firmware, software, hardware, or some combination thereof. In some embodiments, the home gateway 106 operates as a standalone device that is in communication with an existing modem, router, switch, or other network device. In some other embodiments, the home gateway 106 can operate as a piggyback device that communicates directly with an existing modem, router, switch, or other network device. The home gateway 106 alternatively may be proprietary device that provides the functionality described herein.

The term "home" is used herein to broadly encompass a location in which a user (not shown) resides at least part time. As such, the home network 102 can be located in a primary residence, a secondary residence, an office or other place of business, or any other location that the user defines as their "home."

The illustrated home gateway 106 includes a NAT overpopulation detection component 110 and a NAT overpopulation mitigation component 112. The NAT overpopulation detection component 110 can closely monitor a NAT table 114 maintained by the home gateway 106 and can determine when the NAT table 114 is overpopulated with a number of NAT table entries 116 above a pre-defined threshold (referred to herein as an "overpopulation threshold"). The NAT overpopulation mitigation component 112, in response to receiving a notification from the NAT overpopulation detection component 110, can perform one or more mitigation actions to mitigate the effect(s) of NAT overpopulation. The mitigation actions can depend upon the input that the NAT overpopulation detection component 110 produces. One type of mitigation action corresponds to the NAT table entries 116. The NAT overpopulation mitigation component 112 can evacuate or clean any of the NAT table entries 116 that fall into one or more of the following categories: NAT table entries 116 with low volume, NAT table entries 116 tagged as part of a network scan, or NAT table entries 116 from devices that are suspected as malicious (e.g., malicious scanning devices 108C). As an example, suppose the number of evacuated NAT table entries 116 is insufficient to reduce the number of NAT table entries 116 below the overpopulation threshold. In this example, the NAT overpopulation mitigation component 112 can lower timeout values for all of the NAT table entries 116 in the NAT table 114. Thus, inactive NAT table entries 116 can be evacuated more often. Another type of mitigation action corresponds to a policy associated with a participating network device, such as one of the plurality of devices 108. For example, suppose a particular device is identified as a heavy NAT consumer that continuously generates many NAT table entries 116 or has a history of acting aggressively. Acting aggressively in this context means generating a large amount of NAT table entries 116. Generating a large amount of NAT table entries 116 means generating new TCP or UDP connections. A normal device usually has between 1 to 20 connections (NAT table entries 116). An aggressive device, however, may have over a hundred to thousands of NAT table entries.

In this example, the device can be added to a black list 118. An active device that has been added to the black list 118 can be disconnected from the home network 102. If the blacklisted device attempts to reconnect to the home network 102, the home gateway 106 can check the black list 118 to see the entry for the blacklisted device and prevent the blacklisted device from reconnecting to the home network 102. Alternatively, the NAT overpopulation mitigation component 112 can limit the number of NAT table entries 116 that a particular device is allowed to maintain simultaneously. In this case, the device may be allowed to be connected to the home network 102, but the potential damage that device can inflict is contained. The NAT overpopulation mitigation component 112 may be implemented by one or more application programming interfaces ("APIs") that allow evacuating NAT table entries 116, updating entry timeouts, limiting the number of permitted entries for a device, and blocking a device (i.e., equivalent to limiting permitted entries to 0).

An example of the NAT table 114 is illustrated in FIG. 2, which will now be described. The NAT table 114 illustrated in FIG. 2 includes NAT table entries 116A-116D that each represents a connection. The NAT table 114 translates between an internal private address space to an external Internet public access space. Since Internet public IP addresses are scarce, the home gateway 106 allocates private IP addresses that belong to the home network 102. These addresses start with a dedicated prefix, such as one of the following: 10.0.0.0/8, 172.16.0.0/12, 192.168.0.0/16 (where the number after the slash represents the number of bits of the address prefix). Thus, an IP connection is a 5-tuple, including a source IP address, a source port, a destination IP address, and a protocol. The NAT table 114 maps the 5-tuple to a pair of a public source IP and a public source port, where the public source IP is selected from the one or more IP addresses that the home gateway 106 maintains. Each of the NAT table entries 116A in the illustrated NAT table 114 includes an internal source IP address 200, an internal source port 202, an external source IP address 204, an external source port 206, a protocol 208, a destination IP address 210, and a destination port 212.

When a device 108 in the home network 102 sends a packet to a destination on the network(s) 104 (e.g., the Internet), the NAT table 114 allocates a NAT table entry 116 and rewrites the IP packet's source IP and source port to contain the public address and public port. When the destination replies, the NAT table 114 rewrites the public IP and the public port (now in the destination fields) back to the internal private IP and port. A NAT entry's lifetime ends when there is an indication that the connection finishes (e.g., in TCP, a packet with a FIN flag is received) or a timeout expires. A NAT record expiration time varies between different vendors and is usually between a minute to few hours. A NAT table entry 116 that expires before the connection ends may result in data loss and connection termination. Therefore, vendors tend to allocate an expiration period long enough to avoid the pre-termination of a connection. Having too many NAT table entries degrades the performance of the NAT table 114 significantly. For each incoming packet, the NAT table 114 performs the following tasks: lookup for a matching NAT table entry 116, allocate a new NAT table entry 116, rewrite the header IP address and port values, and calculate and rewrite the packet checksum. Larger NAT tables make it more difficult to perform the lookup and the allocation actions. Eventually, when a NAT table 114 fills up, there is no way to initiate new connections to the network(s) 104 (e.g., the Internet).

Turning back to FIG. 1, the NAT overpopulation detection component 110 will be described in further detail. The NAT overpopulation detection component 110 can perform ongoing monitoring and long-term learning processes to improve detection capabilities over time. The illustrated NAT overpopulation detection component 110 includes a plurality of software modules—namely, a NAT behavior learning module 120, a NAT table size monitor module 122, a NAT entry activity analyzer module 124, and a scanning detection module 126. Although the functionality of the NAT overpopulation detection component 110 is described as being performed by these distinct modules, any of these modules can be combined. As such, operations performed by the home gateway 106 should be construed as being performed by one or more processors executing instructions associated with one or more software modules that provide the collective functionality of the NAT overpopulation detection component 110 described herein.

The NAT behavior learning module 120 can perform a behavior learning process to learn the behavior of each of the plurality of devices 108 that are operating as part of the home network 102. First, the NAT behavior learning module 120 can identify each of the plurality of devices 108 that are operating as part of the home network 102. Then, the NAT behavior learning module 120 can determine a number of NAT table entries 116 that each device of the plurality of devices 108 consumes. For each device, the NAT behavior learning module 120 also can generate and maintain a device table 128, an example of which will now be described with reference to FIG. 3.

Turning briefly to FIG. 3, the illustrated device table 128 maintains a device type 302 for each device (e.g., a smartphone, a computer, an IoT device, or other device type). The NAT behavior learning module 120 can extract the device type 302 from information stored in a MAC address 304. The device type 302 can be indicative of how predictable the usage of the device is. Typically, IoT devices are involved in predicted mundane activities. Thus, any deviation from these activities may raise a flag of suspicion of abnormal behavior. A smartphone, however, may have less predictable usage, although certain times of day and certain applications may demonstrate a usage trend. Furthermore, for each device, the NAT behavior learning module 120 can maintain per device statistics 130 (best shown in FIG. 1) of the typical number of NAT table entries 116. The per device statistics 130 can include a number of hours of activity per day (shown as "Hours/Day") 306, an average number of NAT table entries 116 per day (shown as "avg. entries/day") 308, an indication of the peak hour(s) of the day (shown as "peak hour(s) of day") 310, an average number of NAT table entries 116 during the peak hour(s) (shown as "avg. entries/peak hour") 312, and a maximum number of NAT table entries 116 shown as ("max entries") 314. The NAT behavior learning module 120 also can collect NAT table size statistics 132 (also best shown in FIG. 1) about an overall size of the NAT table 114. The NAT behavior learning module 120 can identify data trends based upon the per device statistics 130 and the NAT table size statistics 132. For example, the data trends can be daily trends (hour of the day), weekly trends (e.g., weekends vs. weekdays), and/or long-term trends (e.g., increase or decrease over time of the daily and weekly parameters).

Returning to FIG. 1, the NAT table size monitor module 122 can track the size of the NAT table 114 and can change a status of the home gateway 106 to an alert mode when the number of the NAT table entries 116 meets or exceeds an overpopulation threshold. The overpopulation threshold can be derived from the average learned number of NAT table entries 116 and the maximum size of the NAT table 114. If the average learned number of NAT table entries 116 is significantly smaller than the maximum size of the NAT table 114, the overpopulation threshold can be set, for example, at 30% of the maximum size of the NAT table 114. Otherwise, the overpopulation threshold can be set, for example, at 120% of the average learned number of NAT table entries 116. The above ratios are suggested best practices and may be adjusted as needed according to the network topology. Typical home router devices have NAT table sizes in the range of $2^{10}$ to $2^{14}$ entries. When the home gateway 106 status is in alert mode, the NAT table size monitor module 122 can identify the devices with multiple NAT entries (shown as 108A).

The NAT entry activity analyzer module 124 can identify devices that have a low traffic volume to the number of entries ratio (shown as 108B). The first metric determines devices with an absolute large number of NAT table entries 116. A device with an absolute large number of NAT table entries 116 may be a device with over 100 NAT table entries 116. A default threshold value can be established for any device with more than a specific number (e.g., 500) NAT table entries 116 to lower false positive detection. In contrast, the second metric distinguishes between active devices that generate high traffic in general and devices that mainly generate stale or empty connections that take up space in the NAT table 114. A stale connection may be one that has less than 100 bytes per minute, for example.

The scanning detection module 126 can identify malicious network scanning. Network scanning is the most efficient method for an attacker to overpopulate a NAT table 114. Some network scanning activities, however, are benign and used for research purposes or network inventory. The scanning detection module 126 can flag any device that performs network scanning as malicious (shown as malicious scanning devices 108C) based on their type. For instance, a smart light bulb or a baby monitor should not perform Internet scan activities. Other devices such as a computer may perform Internet scanning for benign purposes.

Figure 4:
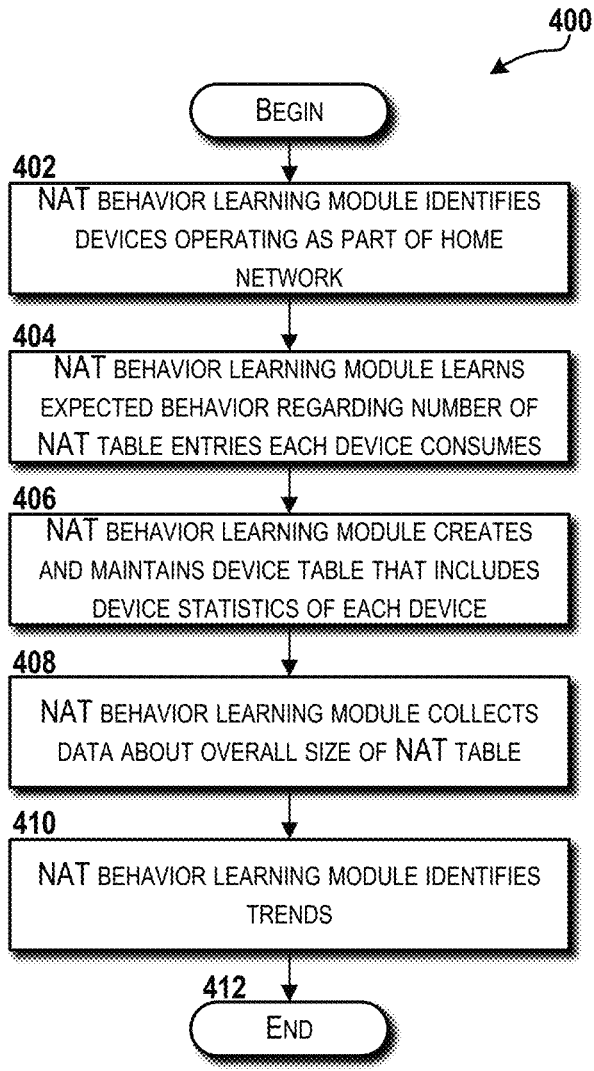
FIG. 4 is a flow diagram illustrating aspects of a method for detecting DoS attacks over home gateway NAT, according to an illustrative embodiment of the concepts and technologies disclosed herein.

Turning now to FIG. 4, a flow diagram illustrating aspects of a method 400 for detecting DoS attacks over home gateway NAT will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins and proceeds to operation 402. At operation 402, the NAT behavior learning module 120 identifies the plurality of devices 108 operating as part of the home network 102. For example, the NAT behavior learning module 120 can obtain the MAC address for each device of the plurality of devices 108 and use the MAC address to identify the plurality of devices 108. From operation 402, the method 400 proceeds to operation 404. At operation 404, the NAT behavior learning module 120 learns an expected behavior regarding a number of NAT table entries 116 that each device of the plurality of devices 108 consumes. The expected behavior may change over time if the device develops a trend towards consuming a greater or fewer number of NAT table entries 116. Initially, the NAT behavior learning module 120 can establish a baseline number of NAT table entries 116 based upon the device type 302 determined from the MAC address 304 (e.g., IoT device, smartphone, or computer).

From operation 404, the method 400 proceeds to operation 406. At operation 406, the NAT behavior learning module 120 creates and maintains the device table 128 (best shown in FIG. 3). The device table 128 maintains the device type 302 for each device (e.g., a smartphone, a computer, an IoT device, or other device type) of the plurality of devices 108 operating as part of the home network 102. The NAT behavior learning module 120 can extract the device type 302 from information stored in the MAC address 304. The device type 302 can be indicative of how predictable the usage of the device is. Typically, IoT devices are involved in predicted mundane activities. Thus, any deviation from these activities may raise a flag of suspicion of abnormal behavior. A smartphone, however, may have less predictable usage, although certain times of day and certain applications may demonstrate a usage trend. Furthermore, for each device, the NAT behavior learning module 120 can maintain the per device statistics 130 (best shown in FIG. 1) of the typical number of NAT table entries 116. The per device statistics 130 can include the number of hours of activity per day (shown as "Hours/Day") 306, the average number of NAT table entries 116 per day (shown as "avg. entries/day") 308, the indication of the peak hour(s) of the day (shown as "peak hour(s) of day") 310, the average number of NAT table entries 116 during the peak hour(s) (shown as "avg. entries/peak hour") 312, and the maximum number of NAT table entries 116 (shown as "max entries") 314. From operation 406, the method 400 proceeds to operation 408. At operation 408, the NAT behavior learning module 120 also collects data about the overall size of the NAT table 114 (shown as NAT table size statistics 132).

From operation 408, the method 400 proceeds to operation 410. At operation 410, the NAT behavior learning module 120 can identify data trends based upon the per device statistics 130 and the NAT table size statistics 132. For example, the data trends can be daily trends (hour of the day), weekly trends (e.g., weekends vs. weekdays), and/or long-term trends (e.g., increase or decrease over time of the daily and weekly parameters).

From operation 410, the method 400 proceeds to operation 412. The method 400 can end at operation 412.

Figure 5:
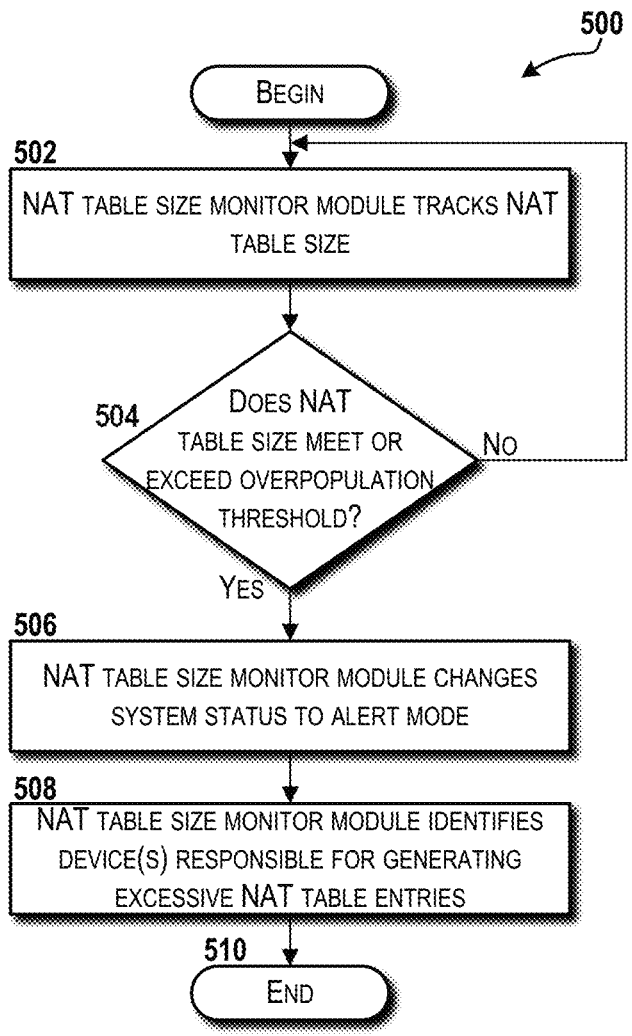
FIG. 5 is a flow diagram illustrating aspects of another method for detecting DoS attacks over home gateway NAT, according to an illustrative embodiment of the concepts and technologies disclosed herein.

Turning now to FIG. 5, a flow diagram illustrating aspects of another method 500 for detecting DoS attacks over home gateway NAT will be described, according to an illustrative embodiment of the concepts and technologies disclosed herein. The method 500 begins and proceeds to operation 502. At operation 502, the NAT table size monitor module 122 tracks the NAT table 114 size. From operation 502, the method 500 proceeds to operation 504. At operation 504, the NAT table size monitor module 122 determines whether the NAT table 114 size meets or exceeds an overpopulation threshold. The overpopulation threshold can be derived from the average learned number of NAT table entries 116 and the maximum size of the NAT table 114. If the average learned number of NAT table entries 116 is significantly smaller than the maximum size of the NAT table 114, the overpopulation threshold can be set, for example, at 30% of the maximum size of the NAT table 114. Otherwise, the overpopulation threshold can be set, for example, at 120% of the average learned number of NAT table entries 116. The above ratios are suggested best practices and may be adjusted as needed according to the network topology. Typical home router devices have NAT table sizes in the range of $2^{10}$ to $2^{14}$ entries. If, at operation 504, the NAT table size monitor module 122 determines that the NAT table 114 size does not at least meet the overpopulation threshold, the method 500 returns to operation 502 and the NAT table size monitor module 122 continues to track the NAT table 114 size. If, however, the NAT table size monitor module 122 determines that the NAT table 114 size meets or exceeds the overpopulation threshold, the method 500 proceeds to operation 506.

At operation 506, the NAT table size monitor module 122 changes a system status to an alert mode. When the home gateway 106 status is in alert mode, the NAT table size monitor module 122 can identify the devices that are responsible for generating multiple NAT entries (shown as 108A) and, of those devices, which are responsible for generating an excessive number of NAT table entries 116 (e.g., 500-1000 NAT table entries 116).

From operation 508, the method 500 proceeds to operation 510. The method 500 can end at operation 510.

Figure 6:
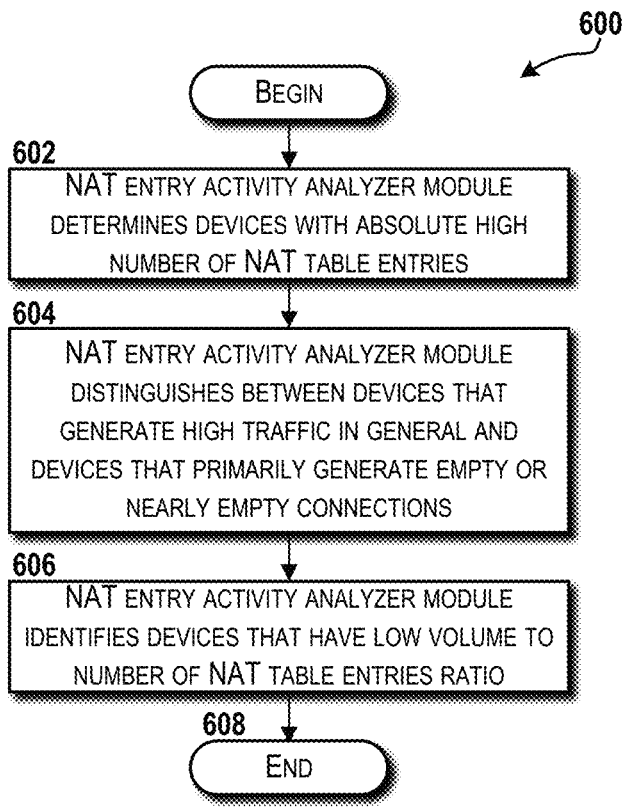
FIG. 6 is a flow diagram illustrating aspects of another method for detecting DoS attacks over home gateway NAT, according to an illustrative embodiment of the concepts and technologies disclosed herein.

Turning now to FIG. 6, a flow diagram illustrating aspects of another method 600 for detecting DoS attacks over home gateway NAT will be described, according to an illustrative embodiment of the concepts and technologies disclosed herein. The method 600 begins and proceeds to operation 602. At operation 602, the NAT entry activity analyzer module 124 determines one or more of the plurality of devices 108 that are associated with an absolute high number of NAT table entries 116. The absolute high number can be either 500 or 1000 generated by a single device, for example. This value can depend on the environment. A default value can be set to 500 and may be adjusted as needed. From operation 602, the method 600 proceeds to operation 604. At operation 604, the NAT entry activity analyzer module 124 distinguishes between devices that generate high traffic in general and devices that primarily generate empty or nearly empty connections. From operation 604, the method 600 proceeds to operation 606. At operation 606, the NAT entry activity analyzer module 124 identifies devices that have a low volume to number of NAT table entries ratio (shown generally as 108B).

From operation 606, the method 600 proceeds to operation 608. The method 600 can end at operation 608.

Figure 7:
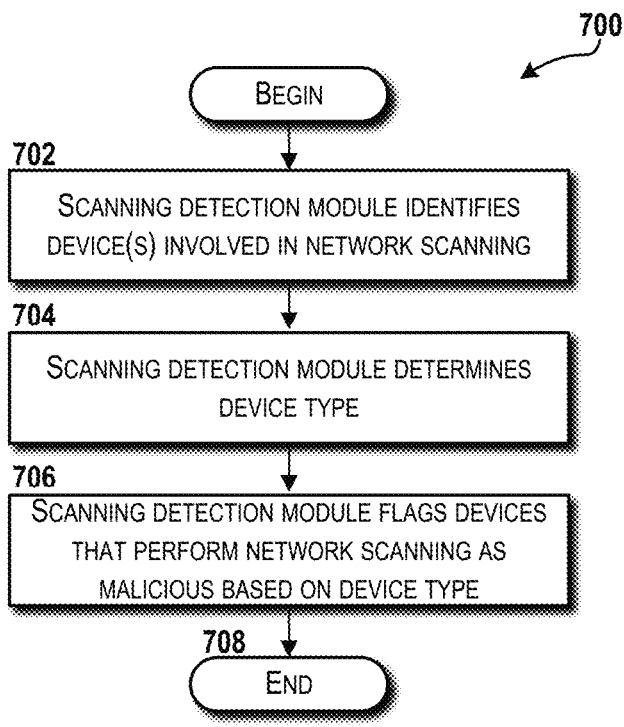
FIG. 7 is a flow diagram illustrating aspects of another method for detecting DoS attacks over home gateway NAT, according to an illustrative embodiment of the concepts and technologies disclosed herein.

Turning now to FIG. 7, a flow diagram illustrating aspects of another method 700 for detecting DoS attacks over home gateway NAT will be described, according to an illustrative embodiment of the concepts and technologies disclosed herein. The method 700 begins and proceeds to operation 702. At operation 702, the scanning detection module 126 identifies one or more of the plurality of devices 108 that are involved in network scanning activity. From operation 702, the method 700 proceeds to operation 704. At operation 704, the scanning detection module 126 determines a device type for the device(s) 108 identified at operation 702. For example, the scanning detection module 126 can consult the device table 128 maintained by the NAT behavior learning module 120 to determine the device type(s). From operation 704, the method 700 proceeds to operation 706. At operation 706, the scanning detection module 126 flags any device that performs network scanning as malicious based on the device type. For instance, a smart light bulb or a baby monitor should not perform network scanning activities and so these devices would be flagged as malicious if found to be engaging in network scanning activity. Other devices such as a computer may perform network scanning for benign purposes and so these devices would not be flagged as malicious. It should be understood, however, that the scanning detection module 126 may take into account additional data points in making the determination of whether or not to flag a device as malicious. For example, a high frequency with which the network scanning activity occurs may be indicative of malicious intent.

From operation 706, the method 700 proceeds to operation 708. The method 700 can end at operation 708.

Figure 8:
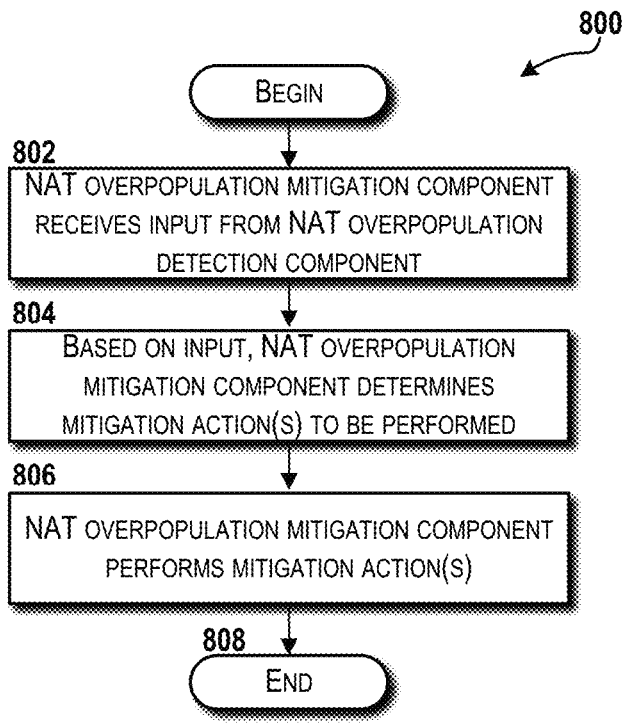
FIG. 8 is a flow diagram illustrating aspects of a method for mitigating the effects of DoS attacks over home gateway NAT, according to an illustrative embodiment of the concepts and technologies disclosed herein.

Turning now to FIG. 8, a flow diagram illustrating aspects of a method 800 for mitigating DoS attacks over home gateway NAT will be described, according to an illustrative embodiment of the concepts and technologies disclosed herein. The method 800 begins and proceeds to operation 802. At operation 802, the NAT overpopulation mitigation component 112 receives input from the NAT overpopulation detection component 110. The input can be a notification from the NAT overpopulation detection component 110 or a specific module thereof, such as the NAT behavior learning module 120, the NAT table size monitor module 122, the NAT entry activity analyzer module 124, and/or the scanning detection module 126. From operation 802, the method 800 proceeds to operation 804. At operation 804, based on the input, the NAT overpopulation mitigation component 112 can determine one or more mitigation actions to be performed to mitigate the effect(s) of NAT overpopulation. One type of mitigation action corresponds to the NAT table entries 116. The NAT overpopulation mitigation component 112 can evacuate or clean any of the NAT table entries 116 that fall into one or more of the following categories: NAT table entries 116 with low volume, NAT table entries 116 tagged as part of a network scan, or NAT table entries 116 from devices that are suspected as malicious (e.g., malicious scanning devices 108C). As an example, suppose the number of evacuated NAT table entries is insufficient to reduce the number of NAT table entries below the overpopulation threshold. In this example, the NAT overpopulation mitigation component 112 can lower timeout values for all of the NAT table entries 116 in the NAT table 114. Thus, inactive NAT table entries 116 can be evacuated more often. Another type of mitigation action corresponds to a policy associated with a participating network device, such as one of the plurality of devices 108. For example, suppose a particular device is identified as a heavy NAT consumer that continuously generates many NAT table entries 116 or has a history of acting aggressively. Acting aggressively in this context means generating a large amount of NAT table entries 116. Generating a large amount of NAT table entries means generating new TCP or UDP connections. A normal device usually has between 1 to 20 connections (NAT table entries 116). An aggressive device, however, may have over a hundred to thousands of NAT table entries 116. In this example, the device can be added to the black list 118. An active device that has been added to the black list 118 can be disconnected from the home network 102. If the blacklisted device attempts to reconnect to the home network 102, the home gateway 106 can check the black list 118 to see the entry for the blacklisted device and prevent the blacklisted device from reconnecting to the home network 102. Alternatively, the NAT overpopulation mitigation component 112 can limit the number of NAT table entries 116 that a particular device is allowed to maintain simultaneously. In this case, the device may be allowed to be connected to the home network 102, but the potential damage that device can inflict is contained. From operation 804, the method 800 can proceed to operation 806. At operation 806, the NAT overpopulation mitigation component 112 can perform the mitigation action(s) determined at operation 804.

From operation 806, the method 800 proceeds to operation 808. The method 800 can end at operation 808.

Figure 9:
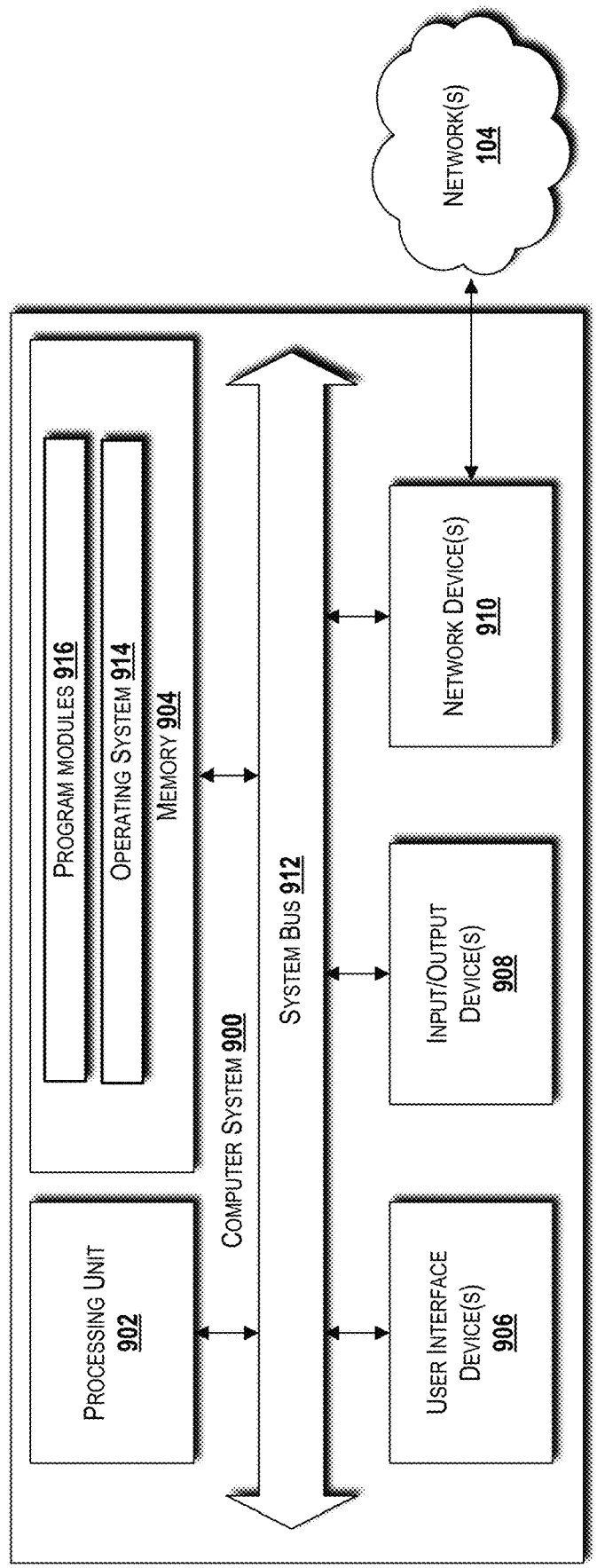
FIG. 9 is a block diagram illustrating an example computer system capable of implementing aspects of the concepts and technologies disclosed herein.

Turning now to FIG. 9, a block diagram illustrating a computer system 900 configured to provide the functionality described herein in accordance with various embodiments. In some embodiments, aspects of one or more of the plurality of devices 108, the home gateway 106, one or more systems operating on or in communication with the network(s) 104, and/or other devices and/or systems disclosed herein can be configured the same as or similar to the computer system 900.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 902 can be a single processing unit or a multiple processing unit that includes more than one processing component. Processing units are generally known, and therefore are not described in further detail herein.

The memory 904 communicates with the processing unit 902 via the system bus 912. The memory 904 can include a single memory component or multiple memory components. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, a member of the ANDROID OS family of operating systems from GOOGLE LLC, the FREEBSD family of operating systems, the SOLARIS family of operating systems from ORACLE CORPORATION, other operating systems, and the like.

The program modules 916 may include various software and/or program modules described herein. The program modules 916 can include, for example, the NAT overpopulation detection component 110, including the individual modules such as the NAT behavior learning module 120, the NAT table size monitor module 122, the NAT entry activity analyzer module 124, and the scanning detection module 126. The program modules 916 can also include, for example, the NAT overpopulation mitigation component 112. In some embodiments, multiple implementations of the computer system 900 can be used, wherein each implementation is configured to execute one or more of the program modules 916. The program modules 916 and/or other programs can be embodied in computer-readable media containing instructions that, when executed by the processing unit 902, perform the methods 400, 500, 600, 700, 800 described herein. According to embodiments, the program modules 916 may be embodied in hardware, software, firmware, or any combination thereof. The memory 904 also can be configured to store data described herein, such as the NAT table 114, the NAT table entries 116, the black list 118, the device table 128, the per device statistics 130, and the NAT table size statistics 132.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium," "computer-readable storage medium," and variations thereof does not include waves or signals per se and/or communication media, and therefore should be construed as being directed to "non-transitory" media only.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, a touch-sensitive surface, or an electronic stylus. Further, the I/O devices 908 may include one or more output devices.

The network devices 910 enable the computer system 900 to communicate with the network(s) 104. Examples of the network devices 910 include, but are not limited to, a modem, a radio frequency ("RF") or infrared ("IR") or ultraviolet ("UV") transceiver, a telephonic interface, a bridge, a router, or a network card. The network 104 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 10:
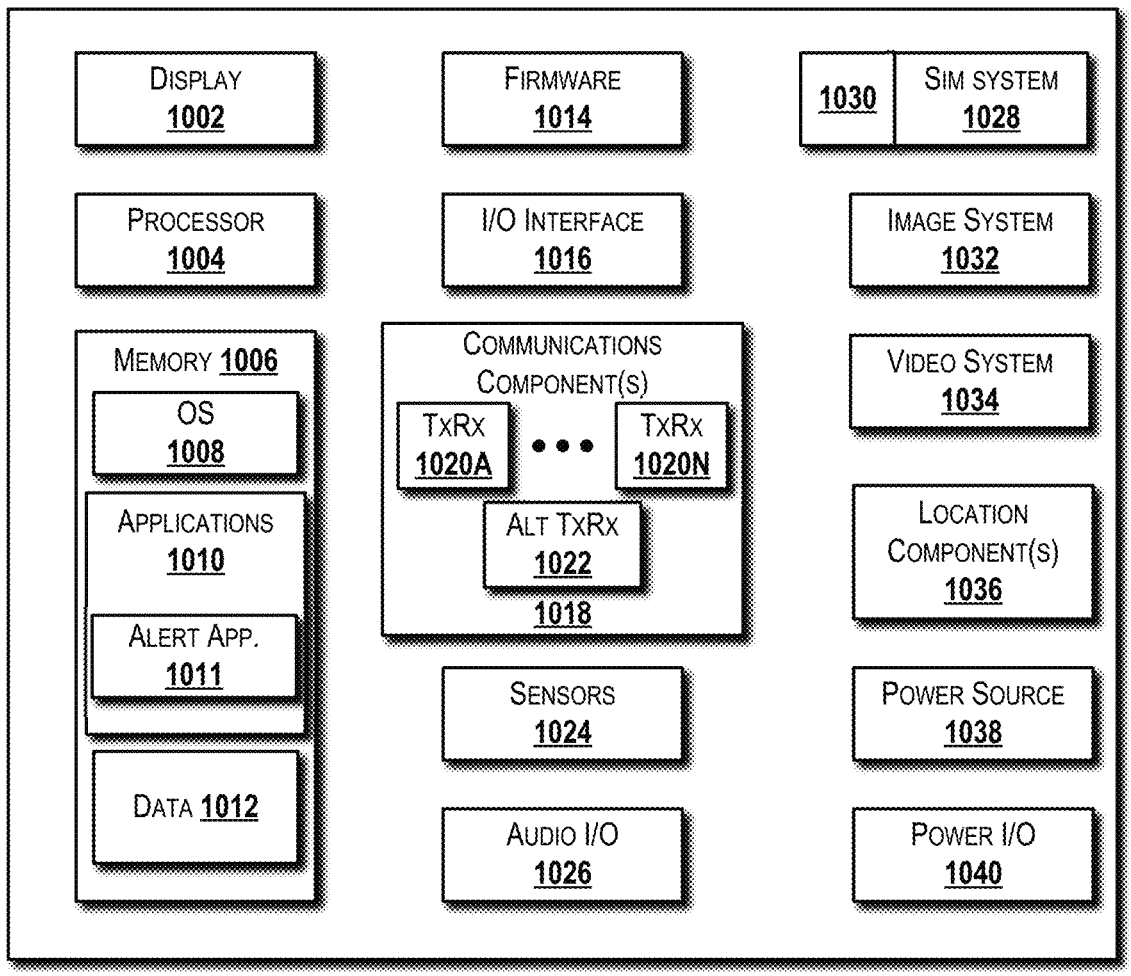
FIG. 10 is a block diagram illustrating an example mobile device capable of implementing aspects of the concepts and technologies disclosed herein.

Turning now to FIG. 10, an illustrative mobile device 1000 and components thereof will be described. In some embodiments, one or more of the plurality of devices 108 can be configured the same as or similar to the mobile device 1000. While connections are not shown between the various components illustrated in FIG. 10, it should be understood that some, none, or all of the components illustrated in FIG. 10 can be configured to interact with one another to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 1000 can also include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008, one or more applications 1010, other computer-executable instructions stored in the memory 1006, or the like. In some embodiments, the applications 1010 can also include a UI application (not illustrated in FIG. 10).

The UI application can interface with the operating system 1008 to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in entering/deleting data, entering and setting user IDs and passwords for device access, configuring settings, manipulating content and/or settings, multimode interaction, interacting with other applications 1010, and otherwise facilitating user interaction with the operating system 1008, the applications 1010, and/or other types or instances of data 1012 that can be stored at the mobile device 1000.

The applications 1010, the data 1012, and/or portions thereof can be stored in the memory 1006 and/or in a firmware 1014, and can be executed by the processor 1004. The firmware 1014 can also store code for execution during device power up and power down operations. It can be appreciated that the firmware 1014 can be stored in a volatile or non-volatile data storage device including, but not limited to, the memory 1006 and/or a portion thereof.

The mobile device 1000 can also include an input/output ("I/O") interface 1016. The I/O interface 1016 can be configured to support the input/output of data such as location information, presence status information, user IDs, passwords, and application initiation (start-up) requests. In some embodiments, the I/O interface 1016 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 can also include a communications component 1018. The communications component 1018 can be configured to interface with the processor 1004 to facilitate wired and/or wireless communications with one or more networks, such as the network(s) 104, or some combination thereof. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments, one or more of the transceivers of the communications component 1018 may be configured to communicate using GSM, CDMA CDMAONE, CDMA2000, LTE, and various other 2G, 2.5G, 3G, 4G, 4.5G, 5G, 6G, 7G, and greater generation technology standards. Moreover, the communications component 1018 may facilitate communications over various channel access methods (which may or may not be used by the aforementioned standards) including, but not limited to, TDMA, FDMA, CDMA, W-CDMA, OFDMA, SDMA, and the like.

In addition, the communications component 1018 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 9G technologies and standards, and various other current and future wireless data access technologies and standards. In the illustrated embodiment, the communications component 1018 can include a first transceiver ("TxRx") 1020A that can operate in a first communications mode (e.g., GSM). The communications component 1018 can also include an Nth transceiver ("TxRx") 1020N that can operate in a second communications mode relative to the first transceiver 1020A (e.g., UMTS). While two transceivers 1020A-1020N (hereinafter collectively and/or generically referred to as "transceivers 1020") are shown in FIG. 10, it should be appreciated that less than two, two, and/or more than two transceivers 1020 can be included in the communications component 1018.

The communications component 1018 can also include an alternative transceiver ("Alt TxRx") 1022, such as the WLAN component(s) 112, for supporting other types and/or standards of communications. According to various contemplated embodiments, the alternative transceiver 1022 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1018 can also facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 can also include one or more sensors 1024. The sensors 1024 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 can also include a subscriber identity module ("SIM") system 1028. The SIM system 1028 can include a universal SIM ("USIM"), a universal integrated circuit card ("UICC"), embedded SIM ("eSIM"), and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Additionally, or alternatively, an embedded SIM may be used. Because other devices and/or modules for identifying users and/or the mobile device 1000 are contemplated, it should be understood that these embodiments are illustrative, and should not be construed as being limiting in any way.

The mobile device 1000 can also include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to an MMS message, email message, and sent to another device. The video and/or photo content can also be shared with other devices via various types of data transfers via wired and/or wireless communication devices as described herein.

The mobile device 1000 can also include one or more location components 1036. The location components 1036 can be configured to send and/or receive signals to determine a geographic location of the mobile device 1000. According to various embodiments, the location components 1036 can send and/or receive signals from global positioning system ("GPS") devices, assisted-GPS ("A-GPS") devices, WI-FI/WIMAX and/or cellular network triangulation data, combinations thereof, and the like. The location component 1036 can also be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 can also include a power source 1038. The power source 1038 can include one or more batteries, power supplies, power cells, and/or other power subsystems including alternating current ("AC") and/or direct current ("DC") power devices. The power source 1038 can also interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1000 or other devices or computers described herein, such as the computer system 900 described above with reference to FIG. 9. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1000 in order to store and execute the software also components presented herein. It is contemplated that the mobile device 1000 may not include all of the components shown in FIG. 10, may include other components that are not explicitly shown in FIG. 10, or may utilize an architecture completely different than that shown in FIG. 10.

Figure 11:
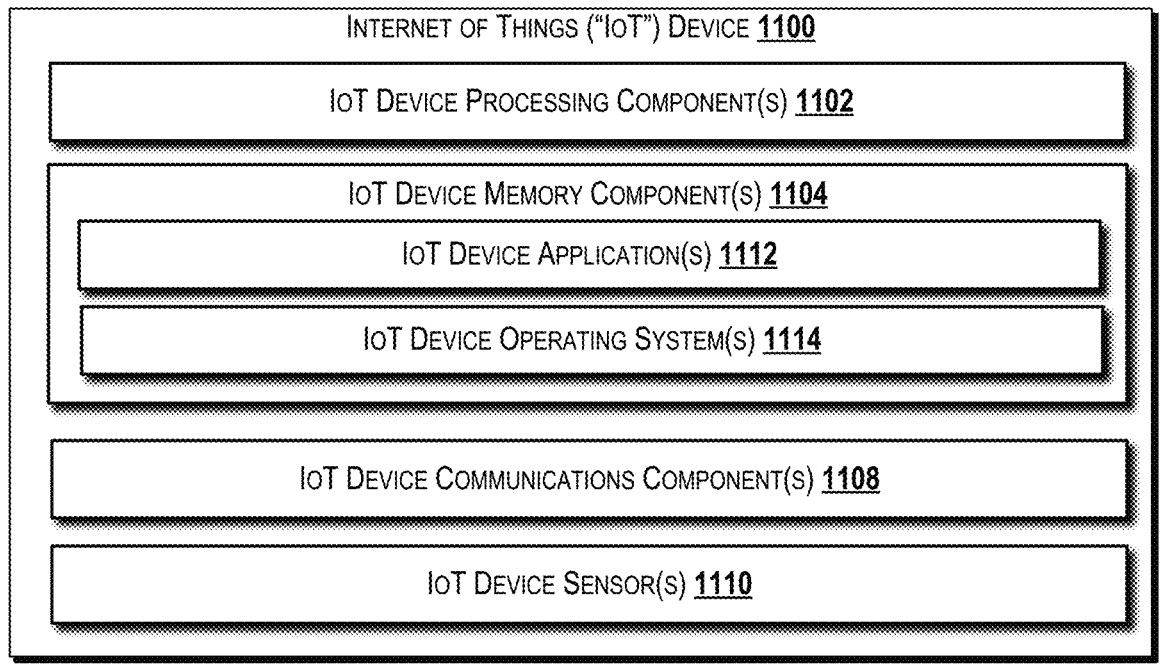
FIG. 11 is a block diagram illustrating an example IoT device capable of implementing aspects of the embodiments presented herein.

Turning now to FIG. 11, a block diagram illustrating aspects of an example IoT device 1100 and components thereof capable of implementing aspects of the embodiments presented herein will be described. In some embodiments, one or more of the plurality of devices 108 is/are configured similar to or the same as the IoT device 1100. While connections are not shown between the various components illustrated in FIG. 11, it should be understood that some, none, or all of the components illustrated in FIG. 11 can be configured to interact with one another to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

The illustrated IoT device 1100 includes one or more IoT device processing components 1102, one or more IoT device memory components 1104, one or more IoT device communications components 1108, and one or more IoT device sensors 1110. The IoT device processing components 1102 can include one or more hardware components that perform computations to process data, and/or to execute computer-executable instructions of one or more application programs such as one or more IoT device application(s) 1112, one or more IoT device operating system(s) 1114, and/or other software. The IoT device processing component(s) 1102 can include one or more CPUs configured with one or more processing cores. The IoT device processing component(s) 1102 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IoT device processing component(s) 1102 can include one or more discrete GPUs. In some other embodiments, the IoT device processing component(s) 1102 can include CPU and GPU components that are configured in accordance with a co-processing CPU/GPU computing model, wherein the sequential part of an application executes on the CPU and the computationally-intensive part is accelerated by the GPU. The IoT device processing component(s) 1102 can include one or more system on a chip ("SoC") components along with one or more other components illustrated as being part of the IoT device 1100, including, for example, the IoT device memory component 1104, the IoT device communications component(s) 1108, the IoT device sensor(s) 1110, or some combination thereof. In some embodiments, the IoT device processing component(s) 1102 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more OMAP SoCs, available from TEXAS INSTRUMENTS of Dallas, Texas; one or more customized versions of any of the above SoCs; and/or one or more proprietary SoCs. The IoT device processing component(s) 1102 can be or can include one or more hardware components architected in accordance with an ARM architecture, available for license from ARM HOLD- INGS of Cambridge, United Kingdom. Alternatively, the IoT device processing component(s) 1102 can be or can include one or more hardware components architected in accordance with an x86 architecture, such an architecture available from INTEL CORPORATION of Mountain View, California, and others. Those skilled in the art will appreciate the implementation of the IoT device processing component(s) 1102 can utilize various computation architectures, and as such, the IoT device processing component(s) 1102 should not be construed as being limited to any particular computation architecture or combination of computation architectures, including those explicitly disclosed herein.

The IoT device memory component(s) 1104 can include one or more hardware components that perform storage operations, including temporary or permanent storage operations. In some embodiments, the IoT device memory component(s) 1104 can include volatile and/or non-volatile memory implemented in any method or technology for storage of information such as computer-readable instructions, data structures, program modules, the IoT device operating system(s) 1114, the IoT device application(s) 1112, any combinations thereof, and/or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IoT device processing component(s) 1102.

The IoT device application(s) 1112 can be executed by the IoT device processing component(s) 1102 to perform various IoT operations. For example, the IoT device application(s) 1112 can instruct the IoT device sensor(s) 1110 to collect data. The IoT device application(s) 1112 can execute on top of the IoT device operating system(s) 1114. In some embodiments, the IoT device application(s) 1112 can be provided as firmware.

The IoT device operating system(s) 1114 can control the operation of the IoT device 1100. In some embodiments, the IoT device operating system(s) 1114 includes the functionality of the IoT device application(s) 1112. The IoT device operating system(s) 1114 can be executed by the IoT device processing component(s) 1102 to cause the IoT device 1100 to perform various operations. The IoT device operating system(s) 1114 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The IoT device sensor(s) 1110 can include any sensor type or combination of sensor types utilizing any known sensor technology that is capable of detecting one or more characteristics of an environment in which the IoT device 1100 is deployed. More particularly, the IoT device sensor(s) 1110 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof.

The IoT device communications component(s) 1108 can include an RF transceiver or separate receiver and transmitter components. The IoT device communications component 1108 can include one or more antennas and one or more RF receivers for receiving RF signals from and one or more RF transmitters for sending RF signals to other IoT devices 1100, other devices 108, the home network 102, and/or the home gateway 106. It is contemplated that the IoT device communications component(s) 1108 also may include a wired connection to the home network 102.

Figure 12:
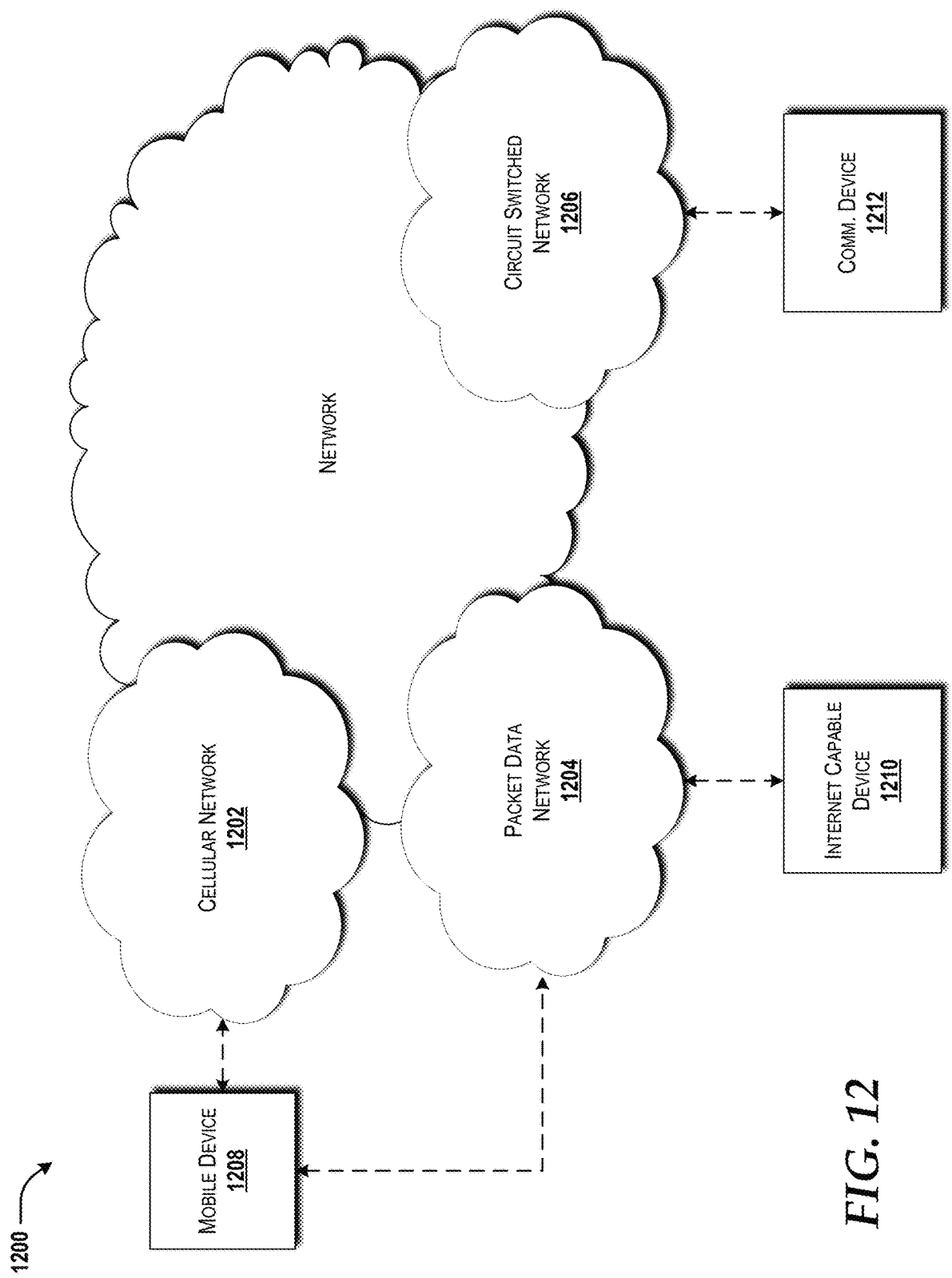
FIG. 12 is a block diagram illustrating an example network capable of implementing aspects of the concepts and technologies disclosed herein.

Turning now to FIG. 12, details of a network 1200 are illustrated, according to an illustrative embodiment. The network 1200 includes a cellular network 1202, a packet data network 1204, and a circuit switched network 1206. The cellular network 1202 includes various components such as, but not limited to, base stations, base transceiver stations ("BTSs"), node Bs ("NBs"), eNBs, gNBs, base station controllers ("BSCs"), radio network controllers ("RNCs"), mobile switching centers ("MSCs"), mobility management entities ("MMEs"), serving gateways ("SGWs"), packet data gateways ("PDGs"), evolved PDGs ("ePDG"), AAA servers, home subscriber servers, short message service centers ("SMSCs"), multimedia messaging service centers ("MMSCs"), home location registers ("HLRs"), visitor location registers ("VLRs"), charging platforms, billing platforms, voicemail platforms, GPRS core network components, EPC core network components, future generation core network components, location service nodes, virtualizations thereof, combinations thereof, and/or the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, one or more of the plurality of devices 108, the mobile device 1000, a cellular telephone, a user equipment, a mobile terminal, a PDA, a laptop computer, a handheld computer, and combinations thereof, can be operatively connected to the cellular network 1202 and/or the packet data network 1204. The mobile communications device 1208 can be configured similar to or the same as the mobile device 1000 described above with reference to FIG. 10.

The cellular network 1202 can be configured as a GSM network and can provide data communications via GPRS and/or EDGE. Additionally, or alternatively, the cellular network 1202 can be configured as a 3G UMTS network and can provide data communications via the HSPA protocol family, for example, HSDPA, EUL, and HSPA+. The cellular network 1202 also is compatible with mobile communications standards such as LTE, 5G-NR, or the like, as well as evolved and future mobile standards.

The packet data network 1204 includes various systems, devices, servers, computers, databases, and other devices in communication with one another, as is generally known. In some embodiments, the packet data network 1204 is or includes one or more WI-FI networks, such as the home network 102. The packet data network 1204 also can include routers, switches, and other WI-FI network components. The packet data network 1204 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 1204 includes or is in communication with the network(s) 104, which can include the Internet. The circuit switched network 1206 includes various hardware and software for providing circuit switched communications. The circuit switched network 1206 may include, or may be, what is often referred to as a plain old telephone system ("POTS"). The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable systems/devices 1210 such as a laptop, a portable device, or another suitable device, can communicate with one or more cellular networks 1202, and devices connected thereto, through the packet data network 1204. It also should be appreciated that the mobile communications device 1208 can communicate directly with the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210.

Figure 13:
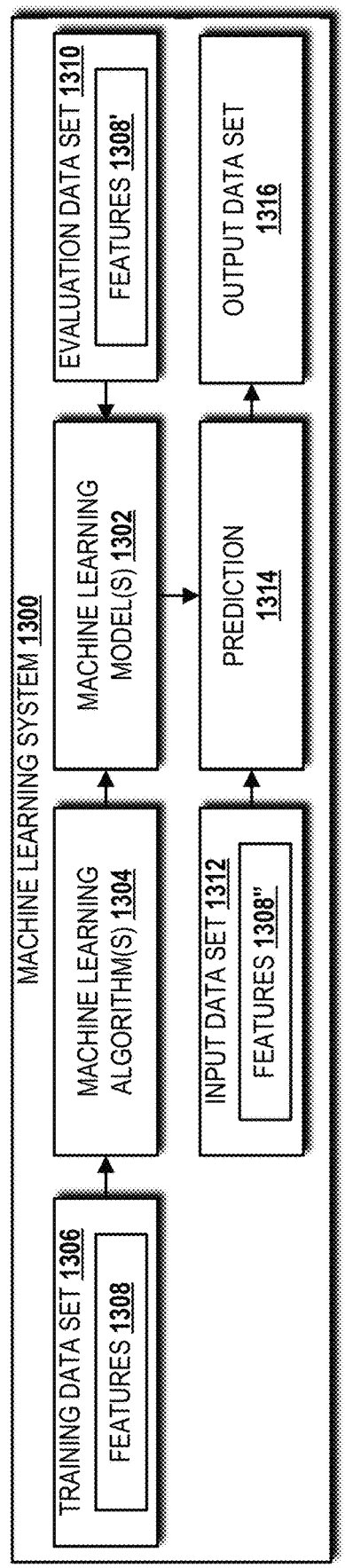
FIG. 13 is a block diagram illustrating an example machine learning system capable of implementing aspects of the concepts and technologies disclosed herein.

Turning now to FIG. 13, a machine learning system 1300 capable of implementing aspects of the embodiments disclosed herein will be described. In some embodiments, the home gateway 106 can include the machine learning system 1300. In other embodiments, the home gateway 106 can operate in communication with the machine learning system 1300.

The illustrated machine learning system 1300 includes one or more machine learning models 1302. The machine learning models 1302 can include, unsupervised, supervised, and/or semi-supervised learning models. The machine learning model(s) 1302 can be created by the machine learning system 1300 based upon one or more machine learning algorithms 1304. The machine learning algorithm(s) 1304 can be any existing, well-known algorithm, any proprietary algorithms, or any future machine learning algorithm. Some example machine learning algorithms 1304 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 1304 based upon the problem(s) to be solved by machine learning via the machine learning system 1300.

The machine learning system 1300 can control the creation of the machine learning models 1302 via one or more training parameters. In some embodiments, the training parameters are selected by machine learning modelers at the direction of an entity (e.g., a device manufacturer, ISP, other service provider, or the user). Alternatively, in some embodiments, the training parameters are automatically selected based upon data provided in one or more training data sets 1306. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1304 converges to the optimal weights. The machine learning algorithm 1304 can update the weights for every data example included in the training data set 1306. The size of an update is controlled by the learning rate. A learning rate that is too high might prevent the machine learning algorithm 1304 from converging to the optimal weights. A learning rate that is too low might result in the machine learning algorithm 1304 requiring multiple training passes to converge to the optimal weights.

The model size is regulated by the number of input features ("features") 1308 in the training data set 1306. A greater the number of features 1308 yields a greater number of possible patterns that can be determined from the training data set 1306. The model size should be selected to balance the resources (e.g., compute, memory, storage, etc.) needed for training and the predictive power of the resultant machine learning model 1302.

The number of training passes indicates the number of training passes that the machine learning algorithm 1304 makes over the training data set 1306 during the training process. The number of training passes can be adjusted based, for example, on the size of the training data set 1306, with larger training data sets being exposed to fewer training passes in consideration of time and/or resource utilization. The effectiveness of the resultant machine learning model 1302 can be increased by multiple training passes.

Data shuffling is a training parameter designed to prevent the machine learning algorithm 1304 from reaching false optimal weights due to the order in which data contained in the training data set 1306 is processed. For example, data provided in rows and columns might be analyzed first row, second row, third row, etc., and thus an optimal weight might be obtained well before a full range of data has been considered. By data shuffling, the data contained in the training data set 1306 can be analyzed more thoroughly and mitigate bias in the resultant machine learning model 1302.

Regularization is a training parameter that helps to prevent the machine learning model 1302 from memorizing training data from the training data set 1306. In other words, the machine learning model 1302 fits the training data set 1306, but the predictive performance of the machine learning model 1302 is not acceptable. Regularization helps the machine learning system 1300 avoid this overfitting/memorization problem by adjusting extreme weight values of the features 1308. For example, a feature that has a small weight value relative to the weight values of the other features in the training data set 1306 can be adjusted to zero.

The machine learning system 1300 can determine model accuracy after training by using one or more evaluation data sets 1310 containing the same features 1308' as the features 1308 in the training data set 1306. This also prevents the machine learning model 1302 from simply memorizing the data contained in the training data set 1306. The number of evaluation passes made by the machine learning system 1300 can be regulated by a target model accuracy that, when reached, ends the evaluation process and the machine learning model 1302 is considered ready for deployment.

After deployment, the machine learning model 1302 can perform a prediction operation ("prediction") 1314 with an input data set 1312 having the same features 1308" as the features 1308 in the training data set 1306 and the features 1308' of the evaluation data set 1310. The results of the prediction 1314 are included in an output data set 1316 consisting of predicted data. The machine learning model 1302 can perform other operations, such as regression, classification, and others. As such, the example illustrated in FIG. 13 should not be construed as being limiting in any way.

Based on the foregoing, it should be appreciated that aspects of detecting and mitigating DoS attacks over home gateway NAT have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A home gateway system comprising:
a processor; and
a memory comprising instructions that, when executed by the processor, cause the processor to perform operations comprising
detecting that a network address translation ("NAT") table is overpopulated, wherein detecting that the NAT table is overpopulated comprises
identifying a plurality of devices operating as part of a home network,
learning an expected behavior regarding a number of NAT table entries that each device of the plurality of devices consumes,
creating and maintaining a device table comprising a device type, a media access control address, and a device statistic for each device of the plurality of devices,
determining a NAT table size statistic that is representative of an overall size of the NAT table,
identifying a data trend for each device of the plurality of devices based upon the device statistic and the NAT table size statistic,
tracking the overall size of the NAT table,
determining whether the overall size of the NAT table meets or exceeds an overpopulation threshold,
in response to determining that the overall size of the NAT table meets or exceeds the overpopulation threshold, changing a status of the home gateway system to an alert mode, and
identifying at least one device of the plurality of devices that is responsible for generating an excessive number of NAT table entries,
in response to detecting that the NAT table is overpopulated, determining a mitigation action to be performed, and
performing the mitigation action.

2. The home gateway system of claim 1, wherein the device statistic comprises a number of hours of activity per day, an average number of NAT table entries per day, an indication of a peak hour of day, an average number of NAT table entries during the peak hour of day, or a maximum number of NAT table entries.

3. The home gateway system of claim 1, wherein the overpopulation threshold is derived, at least in part, from the device statistic.

4. The home gateway system of claim 1, wherein detecting that the NAT table is overpopulated further comprises:
identifying any of the plurality of devices with an absolute high number of NAT table entries;
distinguishing between any of the plurality of devices that generate high traffic in general and any of the plurality of devices that primarily generate empty or nearly empty connections; and
identifying any of the plurality of devices that have a low volume to number of NAT table entries ratio.

5. The home gateway system of claim 4, wherein detecting that the NAT table is overpopulated further comprises:
identifying whether any of the plurality of devices are involved in a network scanning activity;
in response to determining that at least one device of the plurality of devices is involved in the network scanning activity, determining the device type of the at least one device; and
flagging the at least one device as malicious based upon the device type being a certain device type.

6. The home gateway system of claim 5, wherein the mitigation action comprises:
evacuating at least one NAT table entry from the NAT table, wherein the at least one NAT table entry is associated with a low volume, tagged as part of the network scanning activity, or associated with the at least one device flagged as malicious;
blacklisting a particular device of the plurality of devices; or
limiting a maximum number of simultaneous NAT table entries that a particular device is allowed to maintain.

7. A method comprising:
detecting, by a home gateway system comprising a processor, that a network address translation ("NAT") table is overpopulated, wherein detecting that the NAT table is overpopulated comprises identifying, by the home gateway system, a plurality of devices operating as part of a home network, learning, by the home gateway system, an expected behavior regarding a number of NAT table entries that each device of the plurality of devices consumes, creating and maintaining, by the home gateway system, a device table comprising a device type, a media access control address, and a device statistic for each device of the plurality of devices, determining, by the home gateway system, a NAT table size statistic that is representative of an overall size of the NAT table, identifying, by the home gateway system, a data trend for each device of the plurality of devices based upon the device statistic and the NAT table size statistic, tracking, by the home gateway system, the overall size of the NAT table, determining, by the home gateway system, whether the overall size of the NAT table meets or exceeds an overpopulation threshold, in response to determining that the overall size of the NAT table meets or exceeds the overpopulation threshold, changing, by the home gateway system, a status of the home gateway system to an alert mode, and identifying, by the home gateway system, at least one device of the plurality of devices that is responsible for generating an excessive number of NAT table entries;

in response to detecting that the NAT table is overpopulated, determining a mitigation action to be performed; and performing the mitigation action.

8. The method of claim 7, wherein the device statistic comprises a number of hours of activity per day, an average number of NAT table entries per day, an indication of a peak hour of day, an average number of NAT table entries during the peak hour of day, or a maximum number of NAT table entries.

9. The method of claim 7, wherein the overpopulation threshold is derived, at least in part, from the device statistic.

10. The method of claim 7, wherein detecting that the NAT table is overpopulated further comprises:
identifying any of the plurality of devices with an absolute high number of NAT table entries;
distinguishing between any of the plurality of devices that generate high traffic in general and any of the plurality of devices that primarily generate empty or nearly empty connections; and
identifying any of the plurality of devices that have a low volume to number of NAT table entries ratio.

11. The method of claim 10, wherein detecting that the NAT table is overpopulated further comprises:
identifying whether any of the plurality of devices are involved in a network scanning activity;
in response to determining that at least one device of the plurality of devices is involved in the network scanning activity, determining the device type of the at least one device; and
flagging the at least one device as malicious based upon the device type being a certain device type.

12. The method of claim 11, wherein the mitigation action comprises:
evacuating at least one NAT table entry from the NAT table, wherein the at least one NAT table entry is associated with a low volume, tagged as part of the network scanning activity, or associated with the at least one device flagged as malicious;
blacklisting a particular device of the plurality of devices; or
limiting a maximum number of simultaneous NAT table entries that a particular device is allowed to maintain.

13. A computer-readable storage medium comprising computer-executable instructions that, when executed by a processor of a home gateway system, cause the processor to perform operations comprising:
detecting that a network address translation ("NAT") table is overpopulated, wherein detecting that the NAT table is overpopulated comprises
identifying a plurality of devices operating as part of a home network,
learning an expected behavior regarding a number of NAT table entries that each device of the plurality of devices consumes,
creating and maintaining a device table comprising a device type, a media access control address, and a device statistic for each device of the plurality of devices,
determining a NAT table size statistic that is representative of an overall size of the NAT table,
identifying a data trend for each device of the plurality of devices based upon the device statistic and the NAT table size statistic,
tracking the overall size of the NAT table,
determining whether the overall size of the NAT table meets or exceeds an overpopulation threshold,
in response to determining that the overall size of the NAT table meets or exceeds the overpopulation threshold, changing a status of the home gateway system to an alert mode, and
identifying at least one device of the plurality of devices that is responsible for generating an excessive number of NAT table entries;
in response to detecting that the NAT table is overpopulated, determining a mitigation action to be performed; and
performing the mitigation action.

14. The computer-readable storage medium of claim 13, wherein detecting that the NAT table is overpopulated comprises:
identifying any of the plurality of devices with an absolute high number of NAT table entries;
distinguishing between any of the plurality of devices that generate high traffic in general and any of the plurality of devices that primarily generate empty or nearly empty connections;
identifying any of the plurality of devices that have a low volume to number of NAT table entries ratio;
identifying whether any of the plurality of devices are involved in a network scanning activity;
in response to determining that at least one device of the plurality of devices is involved in the network scanning activity, determining the device type of the at least one device; and
flagging the at least one device as malicious based upon the device type being a certain device type.

15. The computer-readable storage medium of claim 13, wherein the device statistic comprises a number of hours of activity per day, an average number of NAT table entries per day, an indication of a peak hour of day, an average number of NAT table entries during the peak hour of day, or a maximum number of NAT table entries; and wherein the overpopulation threshold is derived, at least in part, from the device statistic.

16. The computer-readable storage medium of claim 15, wherein the mitigation action comprises:
   evacuating at least one NAT table entry from the NAT table, wherein the at least one NAT table entry is associated with a low volume, tagged as part of the network scanning activity, or associated with the at least one device flagged as malicious;
   blacklisting a particular device of the plurality of devices; or
   limiting a maximum number of simultaneous NAT table entries that a particular device is allowed to maintain.

* * * * *